United States Patent [19]

Shorr et al.

[11] 4,073,730
[45] Feb. 14, 1978

[54] ULTRAFILTRATION WATER COLLECTOR

[75] Inventors: Jacob Shorr, Lexington; Herbert Fishman, Newton Center, both of Mass.

[73] Assignee: Systems Engineering & Manufacturing Corporation, Stoughton, Mass.

[21] Appl. No.: 703,625

[22] Filed: July 8, 1976

[51] Int. Cl.² .......................................... B01D 13/00
[52] U.S. Cl. .......................... 210/321 R; 210/433 M; 210/450
[58] Field of Search ............ 210/321 R, 23 F, 433 M, 210/450

[56] References Cited

U.S. PATENT DOCUMENTS

| | | | |
|---|---|---|---|
| 3,722,694 | 3/1973 | Agranat | 210/321 R |
| 3,872,014 | 3/1975 | Schell | 210/321 R |
| 3,956,114 | 5/1976 | Del Pico et al. | 210/23 F |
| 3,984,319 | 10/1976 | Hubbard et al. | 210/321 R |

FOREIGN PATENT DOCUMENTS 2,513,751  10/1975  Germany ........................ 210/23 F Primary Examiner—Frank A. Spear, Jr.
Assistant Examiner—E. Rollins Cross
Attorney, Agent, or Firm—Wolf, Greenfield & Sacks

[57] ABSTRACT

A box completely enclosing an ultrafiltration unit forming part of a larger water purification system, has brackets for support of the unit and ports for the entrance and exit of wastewater conduits. A drain located a distance above the bottom of the box permits a moist atmosphere to be maintained in the box during normal operations and a second drain located flush with the bottom of the box permits quick and effective isolation of a unit so that the system operation may be continued in the event of failure of the unit.

8 Claims, 4 Drawing Figures

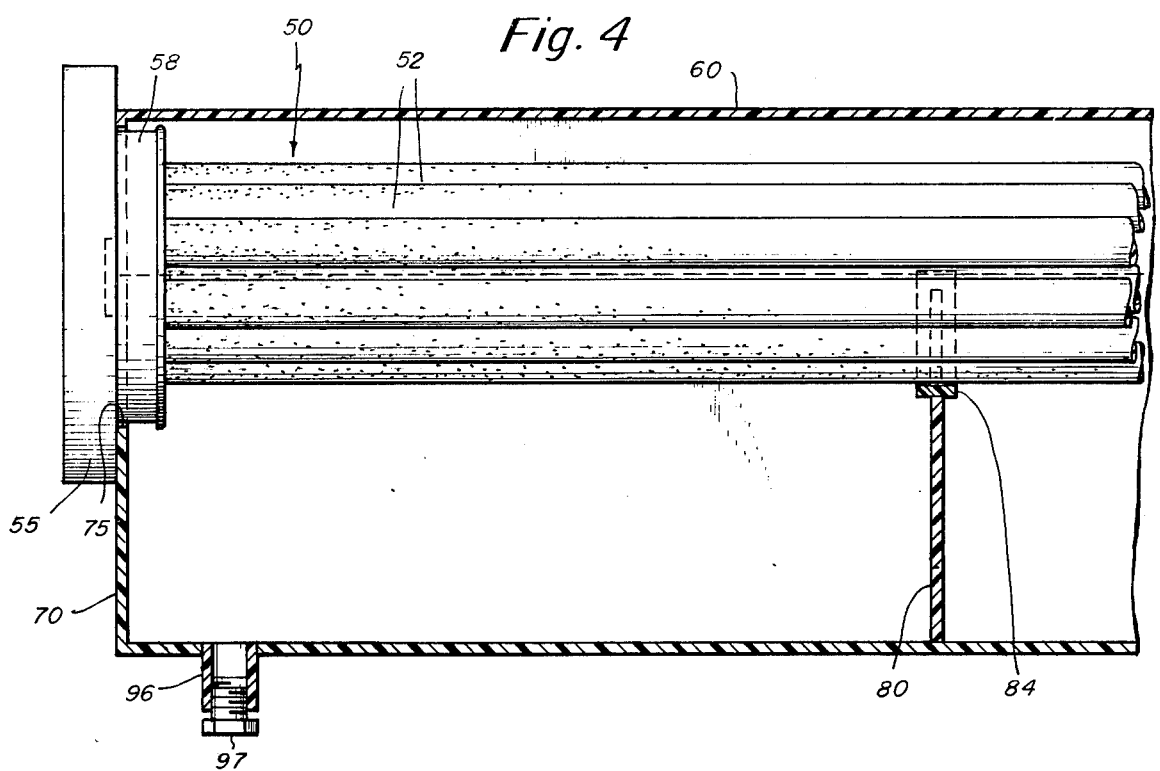

ULTRAFILTRATION WATER COLLECTOR

BACKGROUND OF THE INVENTION

The invention in general relates to water purification systems of the ultrafiltration class and in particular concerns apparatus for collecting the purified water emanating from the filters in such a system.

The ultrafiltration process represents an important advance in water purification technology because it permits a very high level of water purification using simple mechanical means. In this process very thin plastic membranes (about 100 millionths of an inch thick) having very tiny pores (on the order of about 10 angstroms) are used to remove from water all contaminants that have a particle size larger than the pore size. Both suspended and dissolved contaminants are removed. These characteristics of the ultrafiltration process and the nature of the materials which form the ultrafiltration membranes, create several significant problems that are not encountered in conventional water purification systems.

One important limitation on ultrafiltration systems is that the ultrafiltration membranes must constantly be maintained in a wet condition because if the membranes are allowed to dry they irreversibly consolidate and lose their permeability. Previous systems have maintained the wetness of the membranes either by continual pumping water through the membranes, or by immersion of the membranes. The former requires a constant power output which may create a significant additional operating expense. The latter method either reduces the efficiency of the filter because the water creates a back pressure on the filter or requires an immersing operation whenever the system is shut down.

The small pore size of the ultrafiltration membrane plus other characteristics of the ultrafiltration process limit the process to significantly lower flow rates through the filter than in conventional filtration systems. Thus, usually, a very large number of filters, or at least a very large area of membrane is required in a commercial scale system. The large filter area plus the rather thin filter thickness means that the probability of a leak developing somewhere in the filter is significant. Thus, it is very important in an ultrafiltration system that the individual filters or at least small groups of filters be isolable from the system as a whole so that repairs or replacements of the filter may be possible without requiring the shutdown of the entire system. In order to achieve this result ultrafiltration "filter beds" usually are divided up into a large number of units that are individually isolable and replaceable. Previous designs of such systems often required a choice between the following two alternatives: a system that had many units on one conduit, and thus when one unit failed all the units on that conduit had to be shut down while repairs and/or replacements were being performed; or a system in which each unit had its own individual piping system, which design permitted one to shut down only a minimum part of the system when a unit failed, and thus permitted more efficient operation of the system, however this system required significantly higher capital expenditures.

A characteristic of ultrafiltration systems is that the filtrate is very highly purified, thus even a small leak can significantly decrease the purified water quality. Therefore, it is highly desirable in an ultrafiltration system to have the filtrate from each group of filter units capable of being isolated so that leaks would not significantly contaminate the entire purified water system before they could be detected.

Accordingly it is an object of this invention to provide an apparatus for collecting purified water in an ultrafiltration system that overcomes one or more disadvantages of previous ultrafiltration water collection systems.

It is another object of this invention to achieve the preceding object with an ultrafiltration water collection system that maintains the ultrafilters in a wet condition without requiring continuous operation or otherwise reducing the efficiency of the filtration system.

It is a further object of this invention to achieve one or more of the preceding objects with an ultrafiltration water collecting system that permits quick and efficient isolation, repair, and replacement of individual ultrafiltration units without requiring individualized waste water input systems for each unit and at the same time minimizing the contamination of the purified water in the system before and while such repairs and replacements take place.

SUMMARY OF THE INVENTION

According to the invention there is a box for completely enclosing an ultrafiltration filter unit and having a separable section. There is a first drain elevated a distance above the bottom of the box, a second drain preferably located flush with the bottom of the box, an entrance port through which a conduit carrying wastewater passes into the box, and an exit port through which a conduit carrying wastewater passes out of the box. Preferably there is a plurality of brackets for supporting the ultrafiltration unit. Preferably the box comprises a lower container section which is open at the top. A separable cover section preferably having a rim is adopted to substantially conform to a rim of the lower container. A flange is attached to at least one of the rims and adapted so that when the container rim and the cover rim are placed in contact the flange seals a joint formed along the line of contact of the rims. Preferably the entrance and exit ports comprise holes cut in the box centered on the line of junction of the container and cover and the brackets each comprise a plate fixed to the interior walls of the box, having a circular chord cut out of its upper edge, and at least one opening along its lower edge to permit the passage of water along the bottom of the box, and a half-round secured along its outer circumference to the plate along the chord so that it forms a cradle for receiving a filtration unit in the form of a circular bundle of filtration elements.

Numerous other features, objects and advantages of the invention will now become apparent from the following detailed description when read in conjunction with the accompanying drawing, in which:

BRIEF DESCRIPTION OF THE DRAWINGS

FIG. 4 is a cross section view fo the preferred embodiment of the invention taken along line 4—4 of FIG. 3.

DETAILED DESCRIPTION OF THE PREFERRED EMBODIMENT

Figure 1:
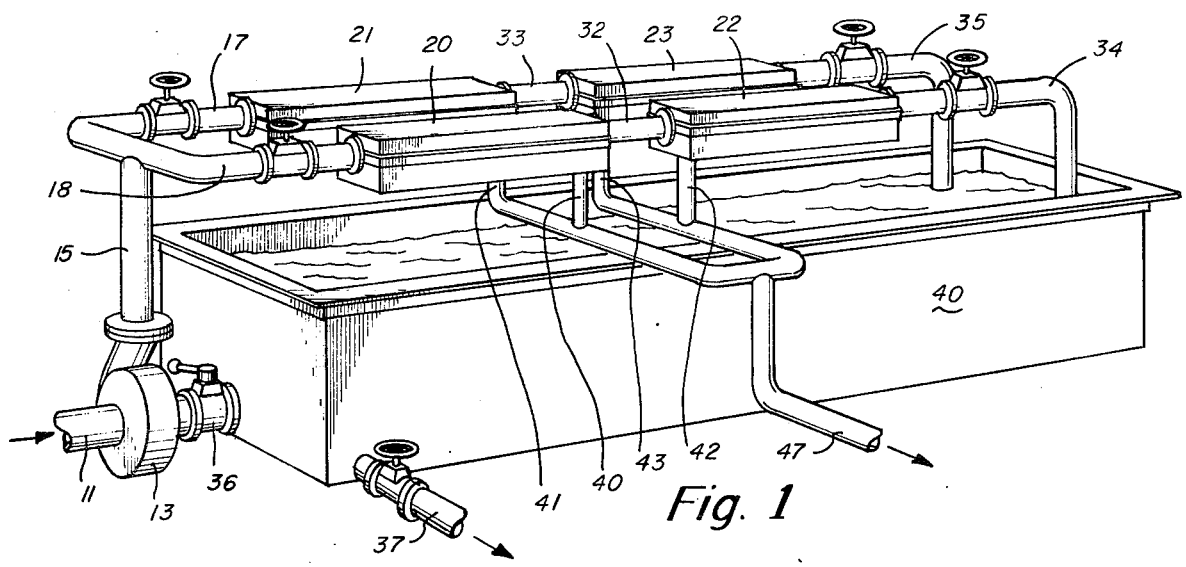
FIG. 1 is a pictorial illustration of an example of a water purification system showing how the preferred embodiment of the invention may be utilized.

With reference now to the drawing and more particularly FIG. 1 thereof, there is shown a pictorial illustration of an example of a water purification system showing how the preferred embodiment of the invention may be utilized. Wastewater enters the water purification system at conduit 11, and pump 13 forces it through conduits 15, 17, and 18 into the ultrafiltration units. The units 50 are enclosed by the preferred embodiment of the invention which are water boxes 20, 21, 22, 23, which collect purified water from the filtration units. Concentrated wastewater exits from water boxes 20, 21, 22, 23 through conduits 32, 33, 34, 35 respectively and enters recirculation tank 40 from which it may be returned to the filtration units through conduit 36 and pump 13 and when it is sufficiently concentrated into a sludge it may be removed for disposal through conduit 37. Purified water exits from water boxes 20, 21, 22, 23 through conduits 40, 41, 42 and 43 respectively.

Figure 2:
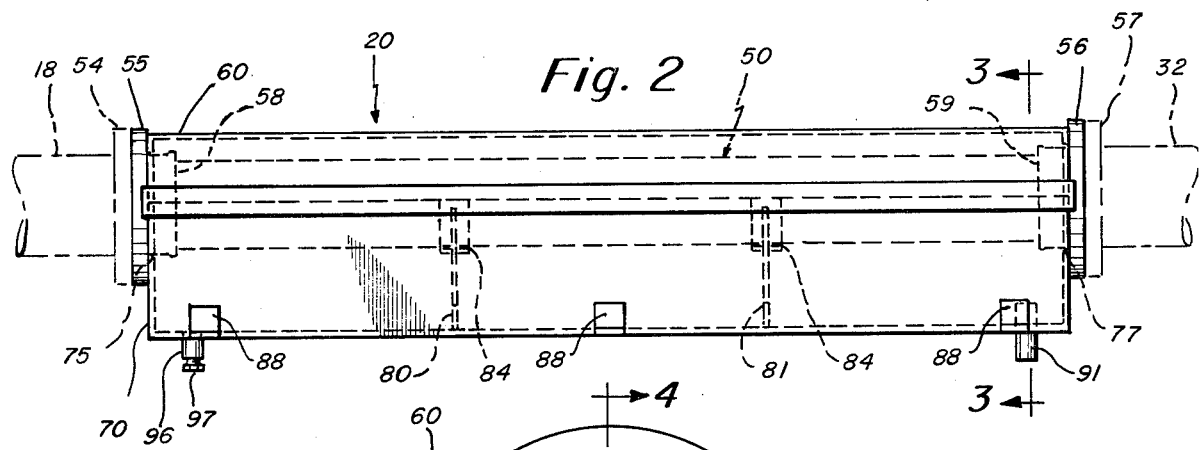
FIG. 2 is a side view of the preferred embodiment of the invention.
Figure 3:
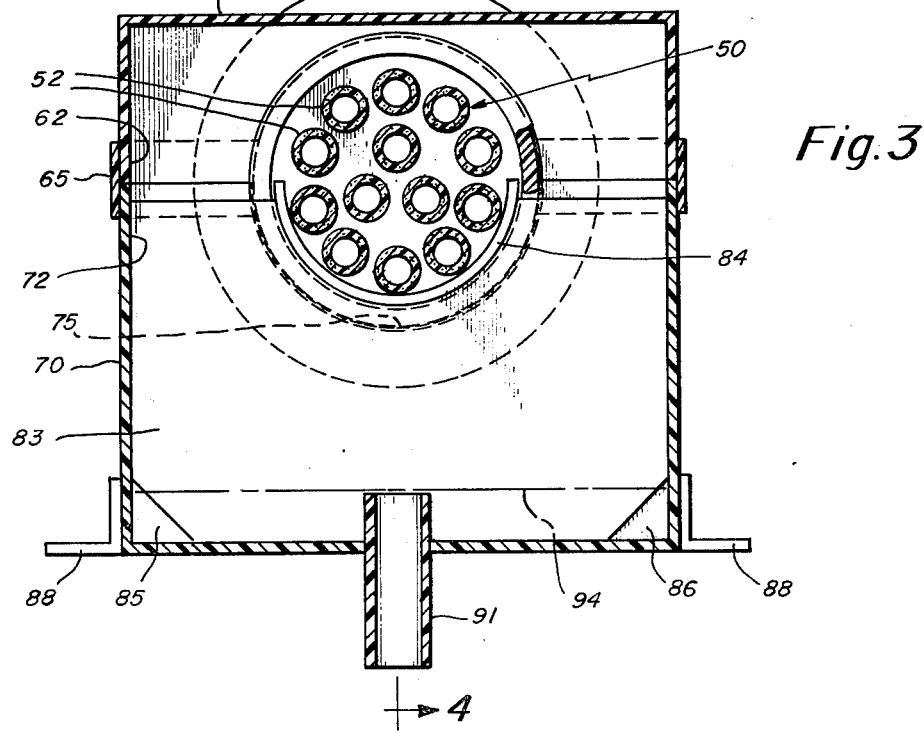
FIG. 3 is a cross sectional view of the preferred embodiment of the invention taken through line 3—3 of FIG. 2.

Water box 20 is shown in FIG. 2 through FIG. 4 and the other water boxes are substantially identical thereto. Water box 20 completely encloses ultrafiltration unit 50 which in the exemplary water purification system of FIG. 1 is a bundle of thirteen ultrafiltration tubes (typically 52). Water box 20 preferably has a generally rectangular cover 60 and generally rectangular lower container 70. Rim 62 of cover 60 conforms to rim 72 of lower container 70, and flange 65 preferably is attached to rim 62 of cover 60 so that when cover 60 is placed on container 70 flange 65 fits all around rim 72 thereby sealing the joint formed along the line of contact of the rims. The seal is a loose seal which provides a water vapor barrier but is not necessarily as hermetic seal.

The precise form and function of entrance port 75 and exit port 77 will depend on the details of the filtration unit from which the invention collects filtrate. In the exemplary embodiment, filtration unit 50 comprises a plurality of filtration tubes 52 cemented into flanges 55 and 56 with adhesive. Flanges 55 and 56 are preferably standard pipe flanges having larger diameter face portions (55 and 56) and smaller diameter neck portions (58 and 59 respectively). In the embodiment shown, filtration unit 50 is connected into wastewater conduits 18 and 32 by means of flanges 54 and 57 respectively which are bolted to the faces of flanges 55 and 56 respectively which form part of filtration unit 50. Neck 58 of flange 55 carrying the wastewater enters water box 20 through entrance port 75 which preferably is a circular opening equal in diameter to neck 58 and cut into water box 20 at the line of junction of cover 60 and container 70. Neck 58 may rest on container 70 in the circular rim of port 75 so that port 75 also partially serves to support filtration unit 50. As the wastewater passes through filtration tubes 52 under pressure, purified water passes out through the side of tubes 52 and drops into container 70. The now concentrated wastewater exits filtration unit 50 and passes into conduit 32 which is connected to flange 56, forming part of filtration unit 50, by means of flange 57. Flange 56 carrying the exiting wastewater concentrate exits water box 20 through exit port 77 which preferably is a hole cut through the water box at the line of junction of cover 60 and container 70 opposite the entrance port. Again neck 59 may rest on the circular rim of port 77. In the preferred embodiment, filtration unit 50 is supported within water box 20 by brackets 80, 81 each of which is preferably a plate 83 and a half-round 84 of a section of a cylinder. Plate 83 is fixed to the sides of container 70 and has a circular chord cut out of the center of its upper edge wherein half-round 84 cylinder is fixed along its outer circumference, so that half-round 84 forms a cradle which contacts the lowermost of filtration tubes 52 of filtration unit 50 and thus supports the unit. Preferably the lower corners of plate 83 are cut out to form openings 85 and 86 which permit the passage of the purified water through the entire length of container 70. Tie down angles 88 are used to secure water box 20 to a supporting framework (not shown in the drawing).

The purified water which emanates from the sides of tubes 52 collects in the bottom of container 70 exits through first drain 91 during normal operation of the water collecting system. First drain 91 is elevated a distance above the bottom of container 70, thus a volume of water 94 is maintained in the water box during normal operation. Alternatively, at other times, second drain 96 may be opened by unscrewing plug 97 whereupon water volume 94 and, until the plug is replaced, all subsequent water falling into container 70 flushes into recirculation tank 40. The inlet of second drain 96 is located below the level of the inlet of first drain 91 and preferably is located at the bottom of container 70.

The water boxes are preferably constructed of ¼ inch polyvinyl chloride (PVC) sheet which is cut, bent, and welded or molded to form rectangular boxes, typically 20, that fit all around the filtration units typically 50 as shown. The precise shape and dimensions of the water boxes will depend on the shape and size of the filtration units to be enclosed; typically they may be 4 to 8 feet long, 1 to 2 feet wide, and 1½ to 2½ feet deep. Plate 83 is also preferably ¼ inch PVC as are angles 88, and half round 84 is preferably a half round of a section of PVC piping. All are preferably fixed in place by welding. In the embodiment shown flanges 54, 55, 56 and 57 are 6-inch flanges and thus half round 84 is preferably a 6-inch PVC schedule 80 pipe section. Drains 91 and 96 are also constructed preferably of PVC piping of appropriate diameters, typically 1¼ to 1½ inches. Although PVC is used throughout due to its resistance to acids and alkalis which are commonly found in wastewater purification systems, fiberglass, stainless steel, or other appropriate materials may be used.

The combination of an enclosed, sealed, box with a dual drainage system is an important feature of the invention. As previously indicated, drain 96 is closed during normal operations so that water may exit only from elevated drain 91 and thus water volume 94 is constantly maintained in the box. This water volume in combination with the covered box provides a moist atmosphere in the water box which aids in maintaining the ultrafiltration membranes in the wet condition which is necessary to prevent their irreversible deterioration. The sealed box/water volume combination makes it possible to shut down the water purification system for up to a day or more depending on the climate external to the water box. If the water purification system must be shut down for longer periods the moisture maintenance system may be augmented by periodically turning on the water purification system for a few seconds or minutes. Since ultrafiltration water purification systems characteristically involve large volumes of water moving at pressures between 10 and 1,000 psig, the ability to shut the system down when water purification is not needed, such as on weekends or holidays, represents a very large savings in operating cost.

In the event of leakage or other failure of the filtration unit, the water volume also serves as a "barrier" between the individual filtration units such as 50 and the purified water in the system to which conduit 47 leads. If a leak develops water volume 94 will dilute the contaminant before it reaches drain 91 so that there will be a time lag between the onset of leakage or other accident and the entry of significant amounts of contaminant into conduit 47. During the period of the time lag, the leak may be discovered and plug 97 may be removed to open drain 96 thereby flushing the contaminated water directly into recirculation tank 40. The elevation of drain 91 above the bottom of container 70 is preferably 1¼ inches; however, in other embodiments of the invention the elevation may vary considerably, typically from ¼ inch to 4 inches. The minimum elevation is determined by the requirement of having a moisturizing surface of water in the water box in order to preserve the ultrafiltration membrane. The maximum elevation is determined by the fact that if too large a volume of water is contained in the water box then a significant quantity of purified water will be "lost" and will have to be repurified if a leak develops or if it is otherwise contaminated. The elevation chosen in any specific embodiment will be determined by consideration of the latter factor plus the length of the "time lag" desired.

The combination of the water box and flush drain 96 also permits one to "take out" an individual filter unit from the water purification system quickly and efficiently even while the system is operating. If it becomes desirable to remove a particular unit from operation because of leakage or for repairs, replacement, inspection, etc., plug 97 may simply be removed and water volume 94 and any subsequent water or contaminants flowing in the container 70 will drain directly into recirculation tank 40. The other filtration units in the system, even those on the same wastewater conduit, may remain in operation. For example, if the filter element in water box 20 (FIG. 1) is "taken out" of service by opening drain 96, the filtration unit in water box 22 may remain in operation (as well as the units in water boxes 21 and 23 of course). Thus the combination of container 70 and drain 96 makes it possible to have individual isolubility of each filtration unit while at the same time permitting more than one unit to be placed along a single wastewater conduit, resulting in significant economies of design and construction.

Another feature of the invention is the combination of easily removable cover 60 and the location of ports 75 and 77 at the line of juncture of cover 60 and container 70. This combination permits the quick and efficient removal and replacement of filter unit 50. This feature together with the isolability created by container 70 and drain 96 permits a water purification system to be operated at or very near maximum capacity continuously and for indefinite periods of time. Thus the user of the water purification system may never have to face the dilemma of either shutting down the process which is producing the wastewater or polluting the environment and breaking the law.

There has been described a novel system for collecting purified water from an ultrafiltration water purification system permitting protection of ultrafiltration membranes and quick and effective isolation of individual ultrafiltration units in an emergency and having numerous other features. It is evident that those skilled in the art may now make numerous uses and modifications of and departures from the specific embodiments described herein without departing from the inventive concepts. For example the water box may be formed as a cylinder either as in a hat box or lengthwise along the filtration units, or as a sphere, polyhedron, or in many other shapes and sizes. Drains 91 and 96 may be located at the sides as well as along the bottom of container 70. There may be less or more than two supporting brackets such as 80 and 81 and the brackets may take the form of angles, triangles, bars, circles, half circles, etc., without departing from the support concept. Ports 75 and 77 may take on a variety of sizes and shapes. Further the invention may be used in combination with almost any conceivable ultrafiltration water purification system and ultrafiltration filter elements. Consequently the invention is to be construed as embracing each and every novel feature and novel combination of features present or possessed by the apparatus herein disclosed.

What is claimed is:

1. An ultrafiltration purified water collector comprising:
   a box for completely enclosing an ultrafiltration filter unit and having a separable section,
   a first drain having an inlet elevated a distance above the bottom of said box,
   a second drain having an inlet located below the level of said first drain inlet,
   an entrance port through which a conduit carrying wastewater passes into said box,
   and an exit port through which a conduit carrying wastewater passes out of said box.

2. An ultrafiltration purified water collector in accordance with claim 1 and further comprising one or more brackets for supporting said ultrafiltration unit,
   said second drain inlet being located at the bottom of said box.

3. An ultrafiltration purified water collector in accordance with claim 2 wherein said box comprises,
   a lower container section which is open at the top,
   a separable cover section having a rim which is adapted to substantially conform to the rim of said lower container,
   a flange attached to at least one of said rims and adapted so that when said container rim and said cover rim are placed in contact said flange seals the joint formed at the line of contact of said rims,
   said entrance and exit ports comprise holes cut in said box centered on the line of junction of said container and cover,
   and said brackets comprise:
   a plate fixed to the interior walls of said box, having a circular chord cut out of its upper edge and at least one opening along its lower edge to permit the passage of water along the bottom of said box,
   and a half round of a section of a cylinder secured along its outer circumference to said plate along said chord so that it forms a cradle for receiving said filtration unit.

4. An ultrafiltration purified water collector in accordance with claim 1 wherein the lower edge of said first drain is located between ¼ inch and 4 inches from the bottom of said box.

5. An ultrafiltration purified water collector comprising:
   a box for completely enclosing an ultrafiltration filter unit and having a separable section,
   a lower container section which is open at the top, a separable cover section having a rim which is adapted to substantially conform to the rim of said lower container, a flange attached to at least one of said rims and adapted so that when said container rim and said cover rim are placed in contact said flange seals the joint formed at the line of contact of said rims, an entrance port through which a conduit carrying wastewater passes into said box, and an exit port through which a conduit carrying wastewater passes out of said box.

6. An ultrafiltration purified water collector in accordance with claim 5 wherein, said entrance and exit ports comprise holes cut in said box centered on the line of junction of said container and cover, and at least one bracket for supporting a tube bundle positioned in said box with said bundle carrying flange means at either end for attachment with mating flange means of a piping system interconnected with said water collector.

7. An ultrafiltration purified water collector in accordance with claim 6 wherein said flange means at either end of said tube bundle are supported by cutout portions of said box at said entrance and exit port.

8. An ultrafiltration purified water collector in accordance with claim 7 and further comprising, a first drain having an inlet elevated a distance above the bottom of said box and a second drain having an inlet located below the level of the first drain inlet.

* * * * *